United States Patent
Li et al.

(10) Patent No.: US 11,027,983 B2
(45) Date of Patent: Jun. 8, 2021

(54) CHABAZITE ZEOLITE SYNTHESIS WITH ORGANIC TEMPLATES

(71) Applicants: Hong-Xin Li, Lansdale, PA (US);
Bjorn Moden, West Chester, PA (US);
Anton Petushkov, Malvern, PA (US)

(72) Inventors: Hong-Xin Li, Lansdale, PA (US);
Bjorn Moden, West Chester, PA (US);
Anton Petushkov, Malvern, PA (US)

(73) Assignee: PQ Corporation, Malvern, PA (US)

( * ) Notice: Subject to any disclaimer, the term of this patent is extended or adjusted under 35 U.S.C. 154(b) by 0 days.

(21) Appl. No.: 16/901,395

(22) Filed: Jun. 15, 2020

(65) Prior Publication Data
US 2020/0392009 A1 Dec. 17, 2020

Related U.S. Application Data

(60) Provisional application No. 62/860,908, filed on Jun. 13, 2019.

(51) Int. Cl.
*C01B 39/48* (2006.01)
*B01J 29/70* (2006.01)
(Continued)

(52) U.S. Cl.
CPC .......... *C01B 39/48* (2013.01); *B01D 53/9418* (2013.01); *B01J 23/72* (2013.01);
(Continued)

(58) Field of Classification Search
CPC ..... C01B 39/48; B01J 29/7015; B01J 29/763; C01P 2006/12; C01P 2006/16; B01D 53/9418
See application file for complete search history.

(56) References Cited

U.S. PATENT DOCUMENTS 4,962,250 A * 10/1990 Dessau .................... B01J 29/04
585/417
9,168,516 B2 * 10/2015 Tian .......................... C07C 1/20
(Continued)

FOREIGN PATENT DOCUMENTS

CN 101469800 A * 7/2009

OTHER PUBLICATIONS

Milanesio et al, "The transformation of lamellar AlPO-kanemite into chabazite-type CAL-1 3D molecular sieve: a structural study" Studies in Surface Science and Catalysis vol. 158, Part A, 2005, pp. 311-318 (Year: 2005).*
(Continued)

*Primary Examiner* — David M Brunsman
(74) *Attorney, Agent, or Firm* — Finnegan, Henderson, Farabow, Garrett & Dunner, LLP

(57) ABSTRACT

An as-synthesized microporous material having a CHA structure and containing at least one organic structure directing agent that has the following general structure of the quaternary ammonium cation is disclosed:

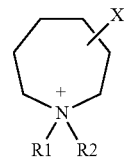

A microporous crystalline material made from the as-synthesized material is also disclosed. A method of making microporous crystalline material using one or more organic structure directing agents is also disclosed. A method of selective catalytic reduction of nitrogen oxides in exhaust
(Continued)

gas that comprises contacting exhaust gases, typically in the presence of ammonia, urea, an ammonia generating compound, or a hydrocarbon compound, with an article comprising the disclosed microporous crystalline is also disclosed.

29 Claims, 9 Drawing Sheets

(51) Int. Cl.
    *B01J 29/76*     (2006.01)
    *B01D 53/94*     (2006.01)
    *B01J 23/72*     (2006.01)
    *B01J 23/745*     (2006.01)
    *B01J 37/02*     (2006.01)
    *B01J 37/04*     (2006.01)
    *B01J 37/30*     (2006.01)
    *F01N 3/20*     (2006.01)

(52) U.S. Cl.
    CPC ........... *B01J 23/745* (2013.01); *B01J 29/763* (2013.01); *B01J 37/0201* (2013.01); *B01J 37/04* (2013.01); *B01J 37/30* (2013.01); *B01J 29/7015* (2013.01); *C01P 2006/12* (2013.01); *C01P 2006/16* (2013.01); *F01N 3/2066* (2013.01); *F01N 2370/04* (2013.01); *F01N 2570/14* (2013.01); *F01N 2610/02* (2013.01)

(56) References Cited

U.S. PATENT DOCUMENTS 10,669,158 B2 *   6/2020   Gounder ................. C01B 39/48
10,682,635 B2 *   6/2020   Chen ..................... B01J 35/1023

OTHER PUBLICATIONS

Igagaki et al, "Textural and Catalytic Properties of MCM-22 Zeolite Crystallized by the Vapor-Phase Transport Method" Bull. Chem. Soc. Jpn., 77, 1249-1254 (2004) (Year: 2004).*
Pastore et al, "Reaction at Interfaces: The Silicoaluminophosphate Molecular Sieve CAL-1", J. Phys. Chem. C 2007, 111, 7, 3116-3129 (Year: 2007).*

* cited by examiner

CHABAZITE ZEOLITE SYNTHESIS WITH ORGANIC TEMPLATES

This application claims the benefit of priority to U.S. Provisional Application No. 62/860,908, filed Jun. 13, 2019, which is incorporated herein by reference in its entirety.

TECHNICAL FIELD

The present disclosure relates generally to as-synthesized microporous material having a CHA structure produced using one or more organic structure directing agents (OSDAs), the resulting chabazite (CHA) zeolites, and method of using the chabazite zeolite for selective catalytic reduction (SCR).

BACKGROUND

Nitric oxides (NOx) have long been known to be polluting gases, principally by reason of their corrosive action. In fact, they are the primary reason for the cause of acid rain. A major contributor of pollution by NOx is their emission in the exhaust gases of diesel automobiles and stationary sources such as coal-fired power plants and turbines. To avoid these harmful emissions, SCR is employed and involves the use of zeolitic catalysts in converting NOx to nitrogen and water.

Thus, there is a continuing need for improved microporous crystalline material that has enhanced economics of production, performance and hydrothermal stability properties to allow for the selective catalytic reduction of NOx in exhaust gases.

Aluminosilicate CHA-type zeolites are important components in commercial selective catalytic reduction (SCR) systems for $NO_x$ abatement in automotive applications. Aluminosilicate CHA-type zeolites can be produced in absence or in presence of OSDAs. Generally, the composition range, such as silica to alumina molar ratio, of chabazite zeolites produced in absence of OSDAs can be limited.

Chabazite zeolites can be produced in presence of one or more OSDAs, sometimes referred to as template and co-template(s). The use of OSDA or OSDAs generally allows a wider range of chabazite zeolite composition, such as silica to alumina ratio. However, certain OSDAs used as templates for chabazite zeolites are known to be costly for large scale commercial use.

Accordingly, there is a need for new OSDAs that can be used instead of or in addition to traditional templating materials, specifically for making chabazite zeolites. There is also a need to reliably replace expensive organo-templates with a less expensive organo-template. More specifically, there is a need for improved OSDAs that allow enhanced economics of production, performance and hydrothermal stability properties, and ultimately to allow for the selective catalytic reduction of NOx in exhaust gases.

SUMMARY

To address the foregoing needs, there is disclosed as-synthesized microporous material having a CHA structure and comprising an OSDA that has a general structure of the quaternary ammonium cation as follows:

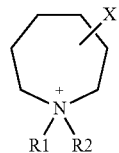

where R1 is a C1-C5 derivatized or underivatized alkyl chain, and R2 is a C2-C5 derivatized or underivatized alkyl chain, where X is H (hydrogen) or a C1-C3 alkyl substituent group or groups, derivatized or underivatized, attached to any combination of carbon atoms constituting the hexahydro-1H-azepinium ring.

There is also disclosed a microporous crystalline material made by calcining the as-synthesized microporous material that is described herein.

There is further disclosed a method of selective catalytic reduction of nitrogen oxides in exhaust gas. In an embodiment, the method comprises at least partially contacting exhaust gases with an article comprising a microporous crystalline material described herein. The contacting step may be performed in the presence of ammonia, urea, an ammonia generating compound, or a hydrocarbon compound.

In an embodiment, there is disclosed a method of making microporous crystalline material having a molar silica to alumina ratio (SAR) of at least 10, such as 10 to 50, and made using a first OSDA having a general structure of the quaternary ammonium cation as follows:

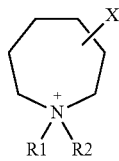

where R1 is a C1-C5 derivatized or underivatized alkyl chain, and R2 is a C2-C5 derivatized or underivatized alkyl chain, where X is H (hydrogen) or a C1-C3 alkyl substituent group or groups, derivatized or underivatized, attached to any combination of carbon atoms constituting the hexahydro-1H-azepinium ring.

In an embodiment, the method comprises mixing sources of alumina, silica, alkali metal, a first OSDA, optionally a second OSDA, and water to form a gel, heating the gel in an autoclave to form a crystalline CHA product, and calcining said CHA product.

BRIEF DESCRIPTION OF THE DRAWINGS

The accompanying figures are incorporated in and constitute a part of this specification.

DESCRIPTION

Definitions

Figure 1:
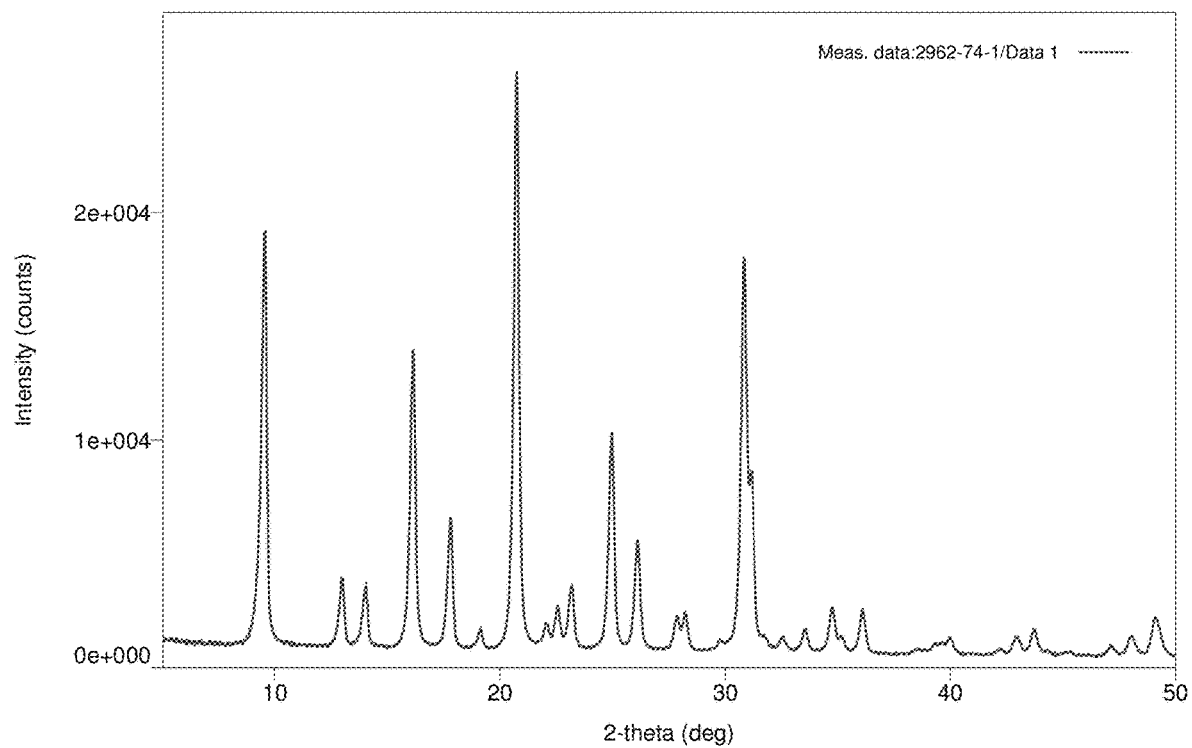
FIG. 1 is an X-ray diffraction pattern of an inventive chabazite product made according to Example 1.

"As-synthesized" means a microporous crystalline material that is the solid product of a crystallized gel, prior to calcination.

"Hydrothermally stable" means having the ability to retain a certain percentage of initial surface area and/or microporous volume after exposure to elevated temperature and/or humidity conditions (compared to room temperature) for a certain period of time. For example, in one embodiment, it is intended to mean retaining at least 65%, such as at least 70%, at least 80%, at least 90%, or even at least 95%, of its surface area, micropore volume and XRD pattern intensity after exposure to conditions simulating those present in an automobile exhaust, such as temperatures up to 900° C., including temperatures ranging from 700 to 900° C. in the presence of up to 10 volume percent (vol %) water vapor for times ranging from up to 1 hour, or even up to 16 hours, such as for a time ranging from 1 to 16 hours.

"Initial Surface Area" means the surface area of the freshly made crystalline material before exposing it to any aging conditions.

"Micropore volume" is used to indicate the total volume of pores having a diameter of less than 20 angstroms. "Initial Micropore Volume" means the micropore volume of the freshly made crystalline material before exposing it to any aging conditions. The assessment of micropore volume is particularly derived from the BET measurement techniques by an evaluation method called the t-plot method (or sometimes just termed the t-method) as described in the literature (Journal of Catalysis 3, 32 (1964)).

Herein "mesopore volume" is the volume of pores having a diameter of greater than 20 angstroms up to the limit of 600 angstroms.

Similarly, "micropore area" refers to the surface area in pores less 20 angstroms, and "mesopore area" refers to the surface area in pores between 20 angstroms and 600 angstroms.

"Defined by the Structure Commission of the International Zeolite Association," is intended to mean those structures included but not limited to, the structures described in "Atlas of Zeolite Framework Types," ed. Baerlocher et al. Sixth Revised Edition (Elsevier 2007), which is herein incorporated by reference in its entirety.

"Double-6-rings (d6r)" is a structural building unit described in "Atlas of Zeolite Framework Types," ed. Baerlocher et al., Sixth Revised Edition (Elsevier 2007), which is herein incorporated by reference in its entirety.

"Selective Catalytic Reduction" or "SCR" refers to the reduction of $NO_x$ (typically with urea and/or ammonia) in the presence of oxygen to form nitrogen and $H_2O$.

"Exhaust gas" refers to any waste gas formed in an industrial process or operation and by internal combustion engines, such as from any form of motor vehicle.

The phrases "chosen from" or "selected from" as used herein refers to selection of individual components or the combination of two (or more) components. For example, catalytically active metal described herein may be chosen from copper and iron, which means the metal may comprise copper, or iron, or a combination of copper and iron.

In a first embodiment, there is described an as-synthesized microporous material having a CHA structure and comprising at least one OSDA that has a general structure of the quaternary ammonium cation as follows:

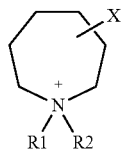

where R1 is a C1-C5 derivatized or underivatized alkyl chain, and

R2 is a C2-C5 derivatized or underivatized alkyl chain, and where X is H (hydrogen) or a C1-C3 alkyl substituent group or groups, derivatized or underivatized, attached to any combination of carbon atoms constituting the hexahydro-1H-azepinium ring.

In an embodiment of the as-synthesized microporous material described herein, at least one of R1 and R2 is ethyl.

In an embodiment, at least one OSDA is a hydroxide or a salt chosen from fluoride, chloride, bromide, iodide, or a mixture thereof.

As indicated, the microporous crystalline material in its as-synthesized form contains the OSDA or OSDAs used for the production of microporous crystalline material. The presence of one or more, such as two, OSDA or OSDAs in the as-synthesized microporous crystalline material before calcination can be determined by means of liquid chromatography. The as-synthesized zeolite sample of a known weight is dissolved in hydrofluoric acid to extract OSDA or OSDAs into the solution. The said solution is analyzed by liquid chromatography to determine the concentration of the OSDA or OSDAs. The weight percentage of the OSDA or OSDAs in the as-synthesized zeolite is then calculated from the concentration of OSDA or OSDAs in the solution and the weight of the as-synthesized zeolite sample. The as-synthesized microporous material described herein comprises the quaternary ammonium cation material in an amount of at least 0.01 wt %, such as from 0.01 to 30 wt %, such as in an amount ranging from 0.01 to 25 wt %, from 0.1 wt % to 22%, or from 1.0 to 20 wt. %. Any version of these ranges are also possible, such as 0.01 to 22 wt %, 0.1 to 20 wt %, or 0.01 to 1.0 wt %.

Applicants have surprisingly discovered that the use of an OSDA (template) can lead to formation of CHA type zeolite, where the OSDA has a general quaternary ammonium cation structure as follows:

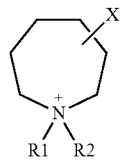

where R1 is a C1-C5 derivatized or underivatized alkyl chain, such as ethyl, and R2 is a C2-C5 derivatized or underivatized alkyl chain, such as ethyl, and where X is H (hydrogen) or a C1-C3 alkyl substituent group or groups, derivatized or underivatized, attached to any combination of carbon atoms constituting the hexahydro-1H-azepinium ring.

The first OSDA can be used in a hydroxide form or in a salt form, including but not limited to fluoride, chloride, bromide, iodide, or acetate forms, or a mixture of thereof.

Applicants have surprisingly discovered that the use of the first OSDA and a second OSDA, which is used in lower than typically practiced quantities, can lead to formation of CHA type zeolite. The first OSDA has a general quaternary ammonium cation structure as follows:

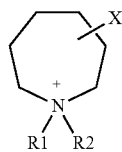

where R1 is a C1-C5 derivatized or underivatized alkyl chain, such as ethyl, and R2 is a C2-C5 derivatized or underivatized alkyl chain, again, such as ethyl, and where X is H (hydrogen) or a C1-C3 alkyl substituent group or groups, derivatized or underivatized, attached to any combination of carbon atoms constituting the hexahydro-1H-azepinium ring.

In an embodiment, the first OSDA can be used in a hydroxide form or in a salt form, including but not limited to fluoride, chloride, bromide, iodide, or acetate forms, or a mixture of thereof.

In an embodiment, the second OSDA is N,N,N-trimethyl-1-adamantylammonium, N-ethyl-N,N-dimethylcyclohexylammonium, or benzyltrimethylammonium in a hydroxide form or in a salt form, including but not limited to fluoride, chloride, bromide, iodide, or acetate forms, or a mixture of thereof.

There is disclosed a useful microporous crystalline material produced using one or more OSDAs, having a molar silica to alumina ratio (SAR) of at least 10, such as ranging from 10 to 50. The disclosed materials are particularly useful for selective catalytic reduction of nitric oxides.

In an embodiment, the microporous crystalline material may comprise a crystal structure having structural code of CHA (chabazite). Zeolitic materials having CHA framework type are three-dimensional 8-membered-ring pore/channel systems containing double-six-rings and cages.

In an embodiment, the as-synthesized microporous material described herein may be used to make a microporous crystalline material made by calcining the as-synthesized microporous material.

In an embodiment, the microporous crystalline material may further comprise at least one catalytically active metal, such as copper or iron. In an embodiment, the catalytically active metal comprises copper Cu, which is present in a CuO of at least 1 wt %, such as 1-10 wt %. In an embodiment, the catalytically active metal comprises iron Fe, which is present in a $Fe_2O_3$ of at least 0.2 wt %, such as 0.2-10 wt %.

There is also disclosed a method of selective catalytic reduction of nitrogen oxides in exhaust gas. In an embodiment, the method comprises at least partially contacting the exhaust gases with an article comprising a microporous crystalline material described herein. The contacting step is typically performed in the presence of ammonia, urea, an ammonia generating compound, or a hydrocarbon compound.

There is also described a method of making microporous crystalline material described herein. In an embodiment, the method comprises mixing sources of alumina, silica, alkali containing additive, one or more organic structural directing agents, and water to form a gel. The method further comprises heating the gel in an autoclave to form a crystalline CHA product, and calcining said CHA product.

In an embodiment, the method further comprises introducing at least one catalytically active metal, such as copper or iron, into the microporous crystalline material by liquid-phase or solid-phase ion exchange, impregnation, direct synthesis or combinations thereof.

In an embodiment, the catalytically active metal comprises copper Cu, which is present in a CuO of at least 1 wt %, such as 1-10 wt %. In an embodiment, the catalytically active metal comprises iron Fe, which is present in a $Fe_2O_3$ of at least 0.2 wt %, such as 0.2-10 wt %.

The method described herein uses one or more OSDAs to form the resulting zeolite material. The first OSDA has a general structure of the quaternary ammonium cation as follows:

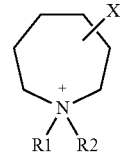

where R1 is a C1-C5 derivatized or underivatized alkyl chain, and R2 is a C2-C5 derivatized or underivatized alkyl chain, and where X is H (hydrogen) or a C1-C3 alkyl substituent group or groups, derivatized or underivatized, attached to any combination of carbon atoms constituting the hexahydro-1H-azepinium ring.

In one embodiment, the quaternary ammonium cation material described herein is present in an amount of at least 0.01 wt %, such as from 0.01 to 30 wt %, such as in an amount ranging from 0.01 to 25 wt %, from 0.1 wt % to 22%, or from 1.0 to 20 wt. %. Any version of these ranges are also possible, such as 0.01 to 22 wt %, 0.1 to 20 wt %, or 0.01 to 1.0 wt %.

In one embodiment, the first OSDA can be used in a hydroxide form or in a salt form, including but not limited to fluoride, chloride, bromide, iodide, or acetate forms, or a mixture of thereof.

In one embodiment, the microporous crystalline material is produced using one or more OSDAs, where the second OSDA is N,N,N-trimethyl-1-adamantylammonium, N-ethyl-N,N-dimethylcyclohexylammonium, or benzyltrimethylammonium in a hydroxide form or in a salt form, including but not limited to fluoride, chloride, bromide, iodide, or acetate forms, or a mixture of thereof.

In another embodiment, the second organic structural directing agent may comprise a compound capable of forming a zeolite with chabazite (CHA) structure. For example, the second organic structural directing agent may comprise a compound, such as an amine, monoquaternary ammonium compound, or diquaternary ammonium compound, capable of forming a zeolite with chabazite (CHA) structure. Non-limiting examples of the compounds capable of forming a zeolite with a CHA structure include N,N-dimethyl-N-ethylcyclohexylammonium, N,N-dimethylpyrrolidinium, N,N-dimethylpiperidinium, N,N-dimethylhexahydroazepinium, benzyltrimethylammonium, and mixtures thereof. These compounds, methods of making them, and methods of using them to synthesize CHA zeolite materials are described in U.S. Pat. Nos. 7,670,589, 7,597,874 B1, and WO 2013/035054, all of which are incorporated herein by reference.

In an embodiment, the alkali containing additive comprises a source of potassium, sodium or a mixture of sodium and potassium. Examples include potassium hydroxide, potassium aluminate, sodium hydroxide and sodium aluminate, respectively.

In an embodiment, the sources of aluminum include but are not limited to sodium aluminate, aluminum salts, aluminum hydroxide, aluminum containing zeolites, aluminum alkoxides, or alumina. The sources of silica can include but are not limited to sodium silicate, potassium silicate, silica gel, silica sol, fumed silica, silica-alumina, zeolites, silicon alkoxides, or precipitated silica.

In an embodiment, the gel is heated in the autoclave at a temperature ranging from 120-200° C. for 1-100 hours, such as 180° C. for 48 hours. The method may further comprise filtering the gel to form a solid product, rinsing the solid product with DI water, drying the rinsed product, calcining the dried product, ammonium or proton exchanging the calcined product.

Measurement Techniques:

Surface area measurements. Surface area was determined in accordance with the well-known BET (Brunauer-Emmett-Teller) nitrogen adsorption technique, also referred to as the "BET method." Herein the general procedure and guidance of ASTM D4365-95 is followed in the application of the BET method to the materials according to the present disclosure. To ensure a consistent state of the sample to be measured, all samples are pretreated. Suitably pretreatment involves heating the sample, for example to a temperature of 400 to 500° C., for a time sufficient to eliminate free water, such as 3 to 5 hours. In one embodiment, the pretreatment comprises heating each sample to 500° C. for 4 hours. In an embodiment, the surface area of the inventive material ranges from 500 to 900 m$^2$/g, such as 550 to 900 m$^2$/g, or even 600 to 900 m$^2$/g.

Micropore volume measurements. The assessment of micropore volume is particularly derived from the BET measurement techniques by an evaluation method called the t-plot method (or sometimes just termed the t-method) as described in the literature (Journal of Catalysis 3, 32 (1964)).

In an embodiment, the zeolitic chabazite materials described herein typically have a micropore volume above 0.12 cm$^3$/g. In an embodiment, the micropore volume of the inventive material ranges from 0.12 to 0.30 cm$^3$/g, such as 0.15 to 0.30 cm$^3$/g, or even 0.18 to 0.30 cm$^3$/g.

Acidity measurements. n-Propylamine was used as a probe molecule for determining the acidity of the CHA materials, since n-Propylamine selectively chemisorbs (chemically adsorbs) on the Bronsted acid sites of CHA. A thermal gravimetric analyzer (TGA) system was used for the measurement, where physically adsorbed n-propylamine was removed by heating to 280° C., and chemically adsorbed n-propylamine was determined from the weight change in a temperature range of 280-500° C. The acidity (acid site density) values were calculated in the unit of mmol/g from the weight change between 280 and 500° C. The following reference is incorporated by reference for its teachings related to acidity measurements, D. Parrillo et al., *Applied Catalysis*, vol. 67, pp. 107-118, 1990.

EXAMPLES

The following non-limiting examples, which are intended to be exemplary, further clarify the present disclosure.

Example 1. Synthesis of 12 SAR CHA 6.1 grams of de-ionized (DI) water, 1.7 grams of N,N,N-Trimethyl-1-adamantylammonium hydroxide (Sachem, 25 wt % solution), 8.8 grams of DEHHAOH (N,N-diethylhexahydro-1H-azepinium hydroxide (20 wt % solution), 0.53 grams of potassium hydroxide (50 wt % solution) were added together to form a mixture. Next, 10.1 grams of silica sol (Ludox HS-40, W. R. Grace, 40 wt % SiO$_2$) was added to the mixture. 2.0 grams of sodium aluminate (Southern Ionics, 23.5 wt % Al$_2$O$_3$) was then added to the mixture, followed by the addition of 0.78 grams of sulfuric acid (Macron, 97 wt %). Next, 0.25 grams of as-synthesized chabazite zeolite powder (14 SAR) was added as seeds. The molar composition of the gel was [14.5 SiO$_2$:1:0 Al$_2$O$_3$:0.51 K$_2$O:1.45 Na$_2$O:0.44 TMAAOH:2.2 DEHHAOH:261H$_2$O]. The resulting gel was crystallized at 160° C. for 48 hours in a stainless steel autoclave (Parr Instruments, 45 ml) while rotating at 30 RPM. The recovered solid was filtered, rinsed with DI water and dried in air at 105° C. overnight. The XRD pattern of Example 1 is shown in FIG. 1. According to the XRD pattern in FIG. 1, the sample from Example 1 is a phase pure chabazite.

The dried zeolite powder was calcined in air for 1 hour at 450° C., followed by 6 hours 550° C. using a ramp rate of 3° C./min. After calcination, the sample was ammonium exchanged with an ammonium nitrate solution. After the ammonium exchange, the sample had an SAR of 12, Na$_2$O of 0.01 wt % and K$_2$O of 0.19 wt %. The acidity of the ammonium-exchanged sample determined by n-propylamine adsorption was 1.77 mmol/g. The ammonium-exchanged sample exhibited the properties summarized in Table 1.

Figure 2:
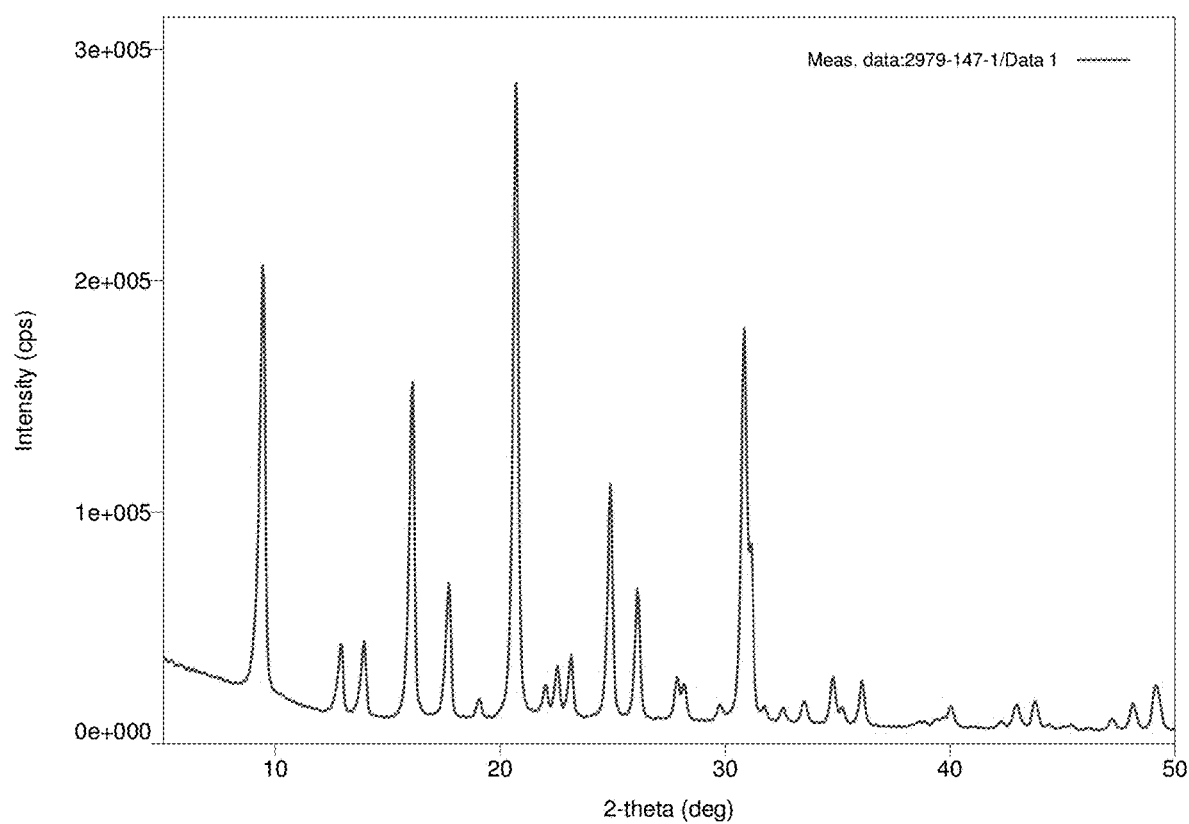
FIG. 2 is a X-ray diffraction pattern of an inventive chabazite product made according to Example 2.

Example 2. Synthesis of 14 SAR CHA 504 grams of DI water, 53.4 grams of N,N,N-trimethyl-adamantylammonium hydroxide (Sachem, 25 wt % solution in water), 76.7 grams of 1,1-diethylhexahydro-1H-azepinium hydroxide (Sachem, 20.4 wt % solution in water), 12.2 grams of potassium hydroxide (50 wt % solution in water), 28.9 grams of nitric acid (69 wt % solution in water), 0.15 grams of seeds with CHA structure, 271 grams of silica sol (Nalco, 40 wt %), and 53.9 grams of sodium aluminate solution (Southern Ionics, 23.5 wt % Al$_2$O$_3$) were mixed together in this order. The molar composition of the gel was [14.5 SiO$_2$:1:0 Al$_2$O$_3$:2.54 HNO$_3$:0.44 K$_2$O:1.52 Na$_2$O:0.51 TMAAOH:0.73 DEHHAOH:363H$_2$O]. The resulting gel was crystallized in a 2 L Parr autoclave under 150 rpm agitation using the following crystallization profile: 140° C. for 24 hours followed by 180° C. for 24 hours. The recovered solid was filtered, rinsed with DI water and dried in air at 105° C. overnight. The XRD pattern of Example 2 is shown in FIG. 2. According to the XRD pattern in FIG. 2, the sample from Example 2 is a phase pure chabazite. According to the liquid chromatography analysis of as-synthesized sample from Example 2, the as-synthesized sample contains 5.5 wt % of 1,1-diethylhexahydro-1H-azepinium OSDA and 9.6 wt % N,N,N-trimethyladamantylammonium OSDA.

The dried zeolite powder was calcined in air for 1 hour at 450° C., followed by 6 hours 550° C. using a ramp rate of 3° C./min. After calcination, the sample was ammonium exchanged with an ammonium nitrate solution. After the ammonium exchange, the sample had an SAR of 14, $Na_2O$ of 0.00 wt % and $K_2O$ of 0.01 wt %. The acidity of the ammonium-exchanged sample determined by n-propylamine adsorption was 1.49 mmol/g. The ammonium exchanged sample exhibited the properties summarized in Table 1.

Example 3. Cu-exchange of Example 2

The ammonium-exchanged zeolite from Example 2 was Cu-exchanged with Cu-nitrate to achieve a CuO content of 3.7 wt % CuO. This Cu-exchanged material was further steamed at 800° C. for 16 hours in 10% $H_2O$/air.

Figure 3:
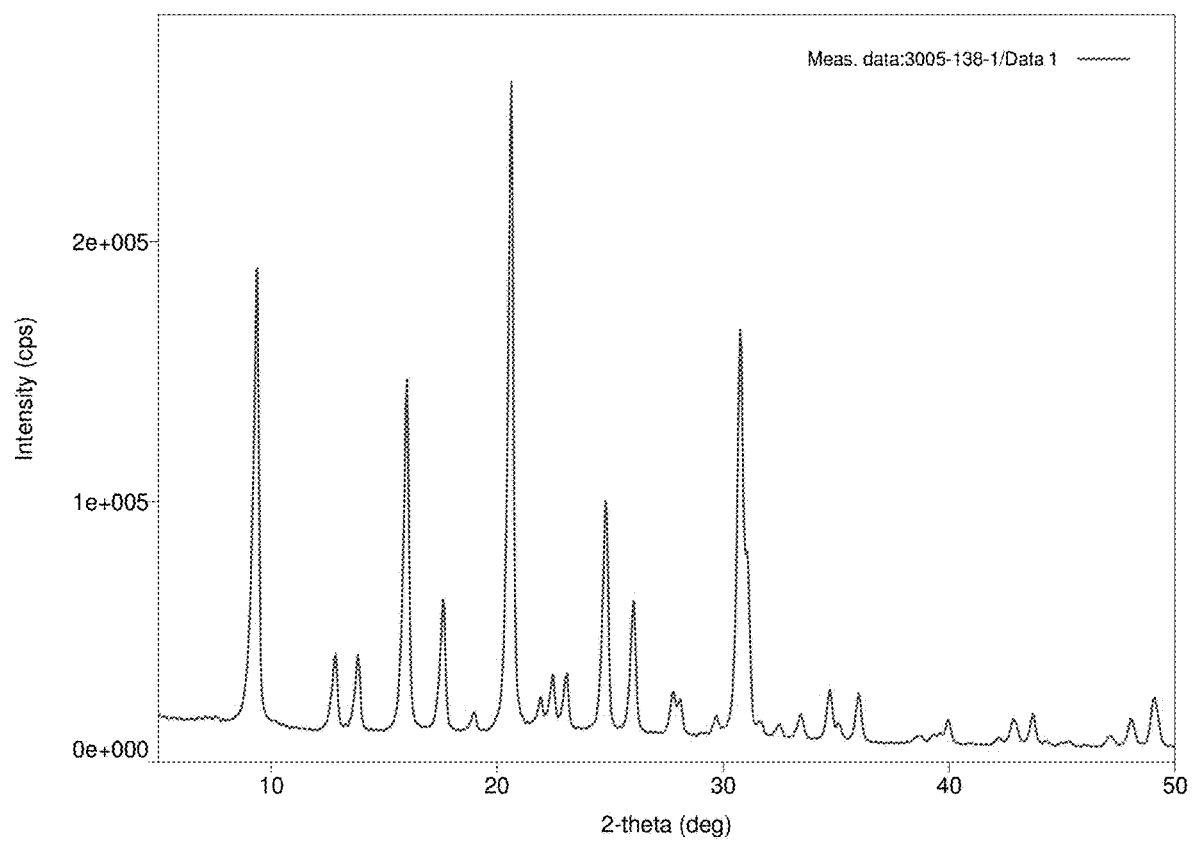
FIG. 3 is a X-ray diffraction pattern of an inventive chabazite product made according to Example 4.

Example 4. Synthesis of 14 SAR CHA 756 grams of DI water, 80.3 grams of N,N,N-trimethyladamantylammonium hydroxide (Sachem, 25 wt % solution in water), 115.6 grams of 1,1-diethylhexahydro-1H-azepinium hydroxide (Sachem, 20.4 wt % solution in water), 18.2 grams of potassium hydroxide (50 wt % solution in water), 43.3 grams of nitric acid (69 wt % solution in water), 0.20 grams of seeds with CHA structure, 407 grams of silica sol (Nalco, 40 wt %), and 80.8 grams of sodium aluminate solution (Southern Ionics, 23.5 wt % $Al_2O_3$) were mixed together in this order. The molar composition of the gel was [14.5 $SiO_2$:1:0 $Al_2O_3$:2.54 $HNO_3$:0.44 $K_2O$:1.52 $Na_2O$:0.51 TMAAOH: 0.73 DEHHAOH: 363$H_2O$]. The resulting gel was crystallized in a 2 L Parr autoclave under 150 rpm agitation using the following crystallization profile: 140° C. for 24 hours followed by 180° C. for 24 hours. The recovered solid was filtered, rinsed with DI water and dried in air at 105° C. overnight. The XRD pattern of Example 4 is shown in FIG. 3. According to the XRD pattern in FIG. 3, the sample from Example 4 is a phase pure chabazite. According to the liquid chromatography analysis of as-synthesized sample from Example 4, the as-synthesized sample contains 5.7 wt % of 1,1-diethylhexahydro-1H-azepinium OSDA and 9.9 wt % N,N,N-trimethyladamantylammonium OSDA.

The dried zeolite powder was calcined in air for 1 hour at 450° C., followed by 6 hours 550° C. using a ramp rate of 3° C./min. After calcination, the sample was ammonium exchanged with an ammonium nitrate solution. After the ammonium exchange, the sample had an SAR of 14, $Na_2O$ of 0.02 wt % and $K_2O$ of 0.24 wt %. The acidity of the ammonium-exchanged sample determined by n-propylamine adsorption was 1.65 mmol/g. The ammonium exchanged sample exhibited the properties summarized in Table 1.

Example 5. Cu-exchange of Example 4

The ammonium-exchanged zeolite from Example 4 was Cu-exchanged with Cu-nitrate to achieve a CuO content of 6.0 wt % CuO. This Cu-exchanged material was further steamed at 750° C. for 16 hours in 10% $H_2O$/air.

Figure 4:
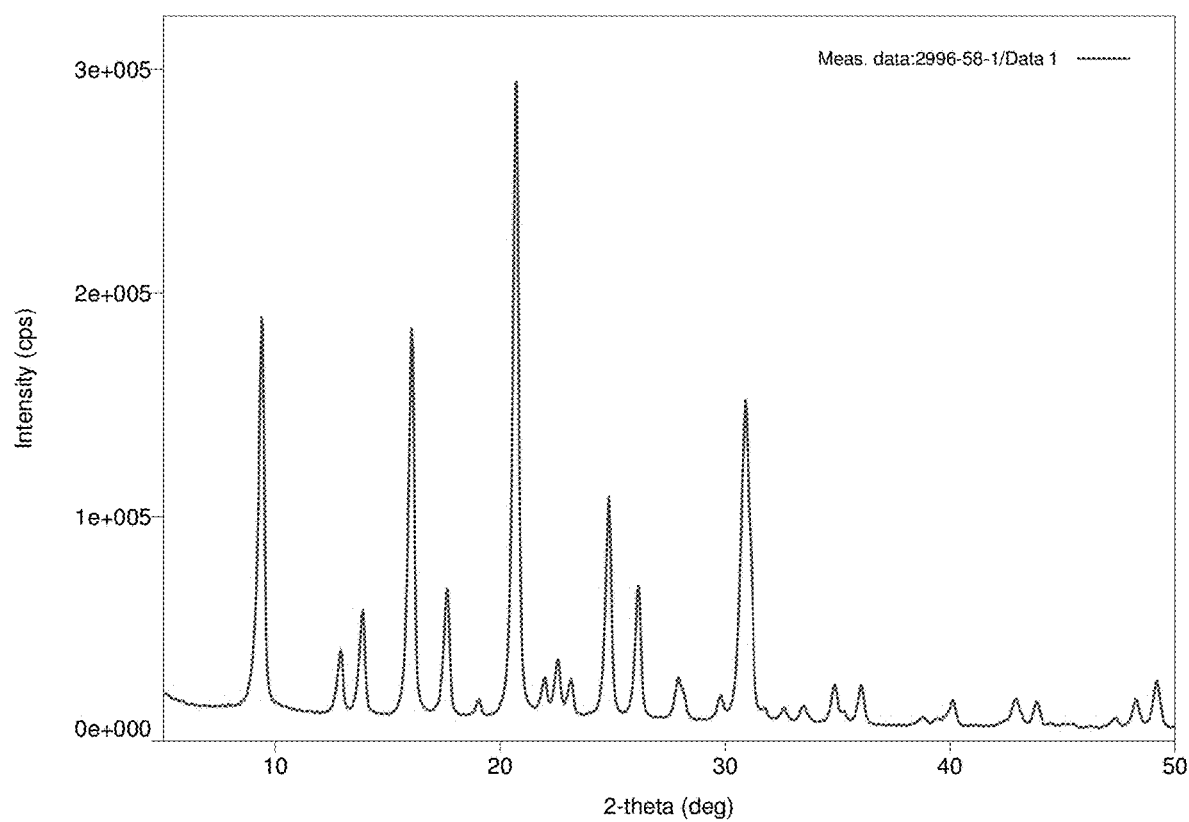
FIG. 4 is a X-ray diffraction pattern of an inventive chabazite product made according to Example 6.

Example 6. Synthesis of 21 SAR CHA 794 grams of DI water, 81.4 grams of N,N,N-trimethyladamantylammonium hydroxide (Sachem, 25 wt % solution in water), 117 grams of 1,1-diethylhexahydro-1H-azepinium hydroxide (Sachem, 20.4 wt % solution in water), 7.3 grams of solid potassium hydroxide, 0.5 grams sodium hydroxide (50 wt % solution in water), 31.4 grams of nitric acid (69 wt % solution in water), 1.1 grams of seeds with CHA structure, 55.4 grams of sodium aluminate solution (Southern Ionics, 23.5 wt % $Al_2O_3$), and 412 grams of silica sol (Nalco, 40 wt % $SiO_2$) were mixed together in this order. The molar composition of the gel was [21 $SiO_2$:1:0 $Al_2O_3$:2.63 $HNO_3$: 0.42 $K_2O$:1.58 $Na_2O$:0.74 TMAAOH: 1.05 DEHHAOH: 525$H_2O$]. The resulting gel was crystallized in a 2 L Parr autoclave under 150 rpm agitation using the following crystallization profile: 160° C. for 48 hours. The recovered solid was filtered, rinsed with DI water and dried in air at 105° C. overnight. The XRD pattern of Example 6 is shown in FIG. 4. According to the XRD pattern in FIG. 4, the sample from Example 6 is a phase pure chabazite. According to the liquid chromatography analysis of as-synthesized sample from Example 6, the as-synthesized sample contains 10 wt % of 1,1-diethylhexahydro-1H-azepinium OSDA and 10 wt % N,N,N-trimethyladamantylammonium OSDA.

The dried zeolite powder was calcined in air for 1 hour at 450° C., followed by 6 hours 550° C. using a ramp rate of 3° C./min. After calcination, the sample was ammonium exchanged with an ammonium nitrate solution. After the ammonium exchange, the sample had an SAR of 21, $Na_2O$ of 0.00 wt % and $K_2O$ of 0.00 wt %. The acidity of the ammonium-exchanged sample determined by n-propylamine adsorption was 1.06 mmol/g. The ammonium-exchanged sample exhibited the properties summarized in Table 1.

Example 7. Cu-Exchange of Example 6

The ammonium-exchanged zeolite from Example 6 was Cu-exchanged with Cu-nitrate to achieve a CuO content of 4.4 wt % CuO. This Cu-exchanged material was further steamed at 800° C. for 16 hours in 10% $H_2O$/air.

Figure 5:
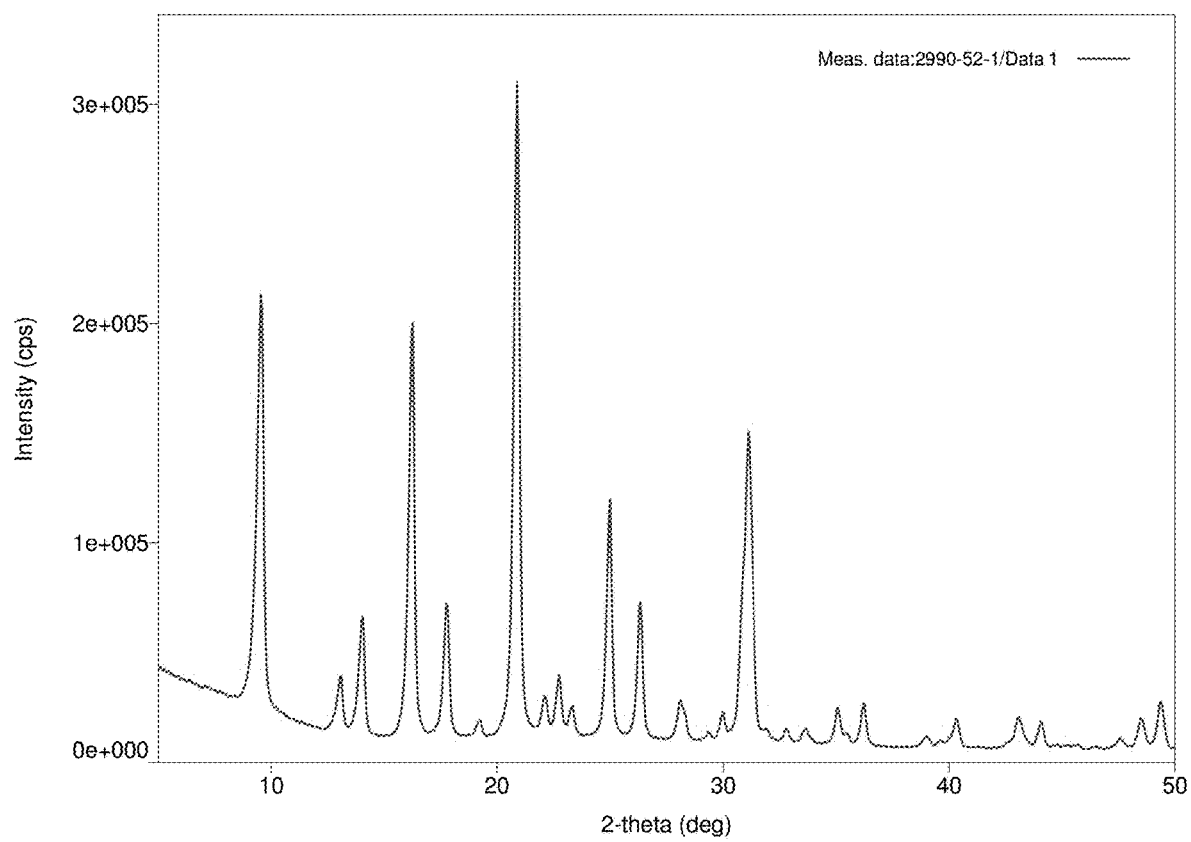
FIG. 5 is a X-ray diffraction pattern of an inventive chabazite product made according to Example 8.

Example 8. Synthesis of 29 SAR CHA 94.5 grams of DI water, 80.9 grams of N,N,N-trimethyladamantylammonium hydroxide (Sachem, 25 wt % solution in water), 203 grams of 1,1-diethylhexahydro-1H-azepinium hydroxide (Sachem, 20.4 wt % solution in water), 3.5 grams of sodium hydroxide (50 wt % solution in water), 24.0 grams of nitric acid (69 wt % solution in water), 1.8 grams of seeds with CHA structure, 359 grams of silica sol (Nalco, 40 wt % $SiO_2$), and 34.6 grams of sodium aluminate solution (Southern Ionics, 23.5 wt % $Al_2O_3$) were mixed together in this order. The molar composition of the gel was [28 $SiO_2$:1:0 $Al_2O_3$:3.08 $HNO_3$:1.82 $Na_2O$:1.12 TMAAOH:2.8 DEHHAOH:364$H_2O$]. The resulting gel was crystallized in a 2 L Parr autoclave under 150 rpm agitation using the following crystallization profile: 140° C. for 24 hours followed by 180° C. for 24 hours. The recovered solid was filtered, rinsed with DI water and dried in air at 105° C. overnight. The XRD pattern of Example 8 is shown in FIG. 5. According to the XRD pattern in FIG. 5, the sample from Example 8 is a phase pure chabazite. According to the liquid chromatography analysis of as-synthesized sample from Example 8, the as-synthesized sample contains 11 wt % of 1,1-diethylhexahydro-1H-azepinium OSDA and 9.7 wt % N,N,N-trimethyladamantylammonium OSDA.

The dried zeolite powder was calcined in air for 1 hour at 450° C., followed by 6 hours 550° C. using a ramp rate of 3° C./min. After calcination, the sample was ammonium exchanged with an ammonium nitrate solution. After the ammonium exchange, the sample had an SAR of 28.8, $Na_2O$ of 0.00 wt % and $K_2O$ of 0.00 wt %. The acidity of the ammonium-exchanged sample determined by n-propylamine adsorption was 1.01 mmol/g. The ammonium-exchanged sample exhibited the properties summarized in Table 1.

Example 9. Cu-Exchange of Example 8

The ammonium-exchanged zeolite from Example 8 was Cu-exchanged with Cu-nitrate to achieve a CuO content of 4.0 wt % CuO. This Cu-exchanged material was further steamed at 800° C. for 16 hours in 10% $H_2O$/air.

Comparative Example 1. Synthesis of CHA

Figure 6:
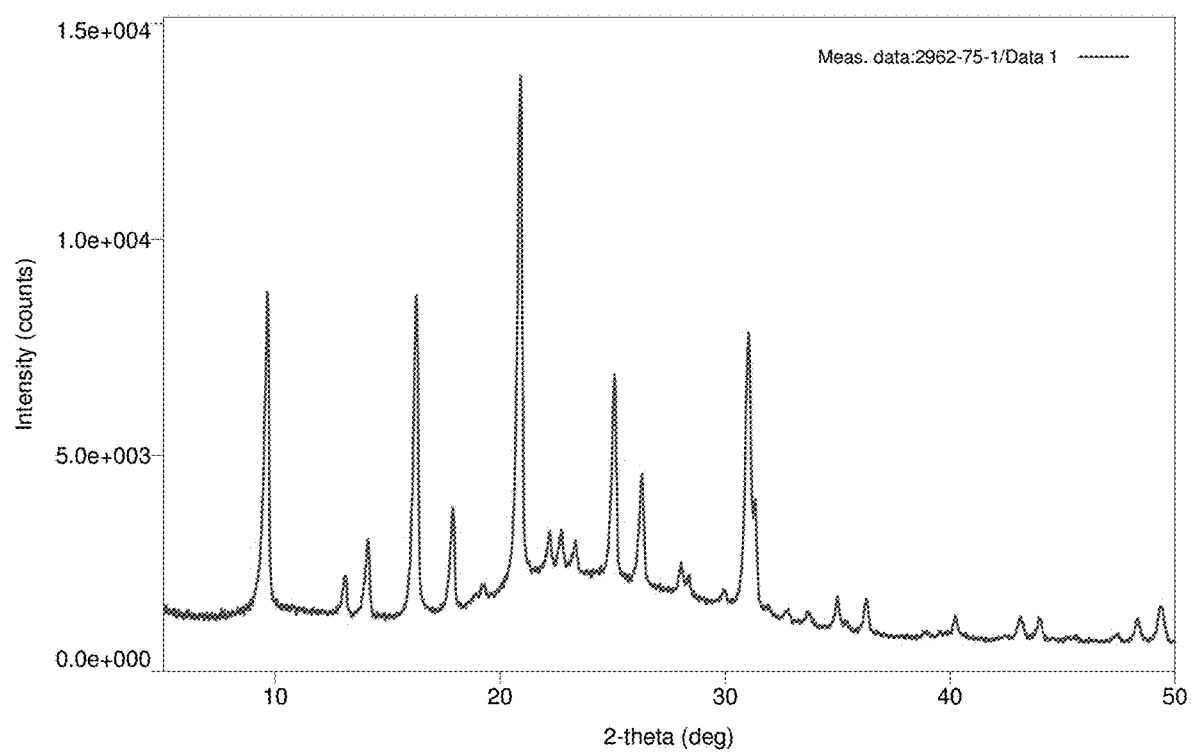
FIG. 6 is a X-ray diffraction pattern of a chabazite product made according to Comparative Example 1.

The sample was prepared following the gel formulation from Example 1, with the exception that 1,1-diethylhexahydro-1H-azepinium hydroxide was not used in the formulation. 14.2 grams of DI water, 1.9 grams of N,N,N-Trimethyl-1-adamantylammonium hydroxide (Sachem, 25 wt % solution), 0.91 grams of potassium hydroxide (50 wt % solution), 0.44 grams of sodium hydroxide solution (Southern Ionics, 50 wt %), were added to form a mixture. 11.3 grams of silica sol (Ludox HS-40, W. R. Grace, 40 wt % $SiO_2$) was then added to the mixture. Next, 2.3 grams of sodium aluminate (Southern Ionics, 23.5 wt % $Al_2O_3$) was added to the mixture, followed by 0.30 grams of sulfuric acid (Macron, 97 wt %). 0.28 grams of as-synthesized chabazite zeolite powder (14 SAR) was then added as seeds. The molar composition of the gel was [14.5 $SiO_2$:1:0 $Al_2O_3$:0.78 $K_2O$:2.1 $Na_2O$:0.44 TMAAOH:261$H_2O$]. The resulting gel was crystallized at 160° C. for 48 hours in a stainless steel autoclave (Parr Instruments, 45 ml) while rotating at 30 RPM. The recovered solid was filtered, rinsed with DI water and dried in air at 105° C. overnight. The XRD pattern of Comparative Example 1 is shown in FIG. 6. According to the XRD pattern in FIG. 6, the sample from Comparative Example 1 is a mixture of chabazite and an amorphous phase.

The dried zeolite powder was calcined in air for 1 hour at 450° C., followed by 6 hours 550° C. using a ramp rate of 3° C./min. After calcination, the sample was ammonium exchanged with an ammonium nitrate solution. After the ammonium exchange, the sample had an SAR of 15, $Na_2O$ of 0.31 wt % and $K_2O$ of 1.19 wt %. The acidity of the ammonium-exchanged sample determined by n-propylamine adsorption was 0.37 mmol/g. The ammonium exchanged sample exhibited the properties summarized in Table 1.

Comparative Example 2

Figure 7:
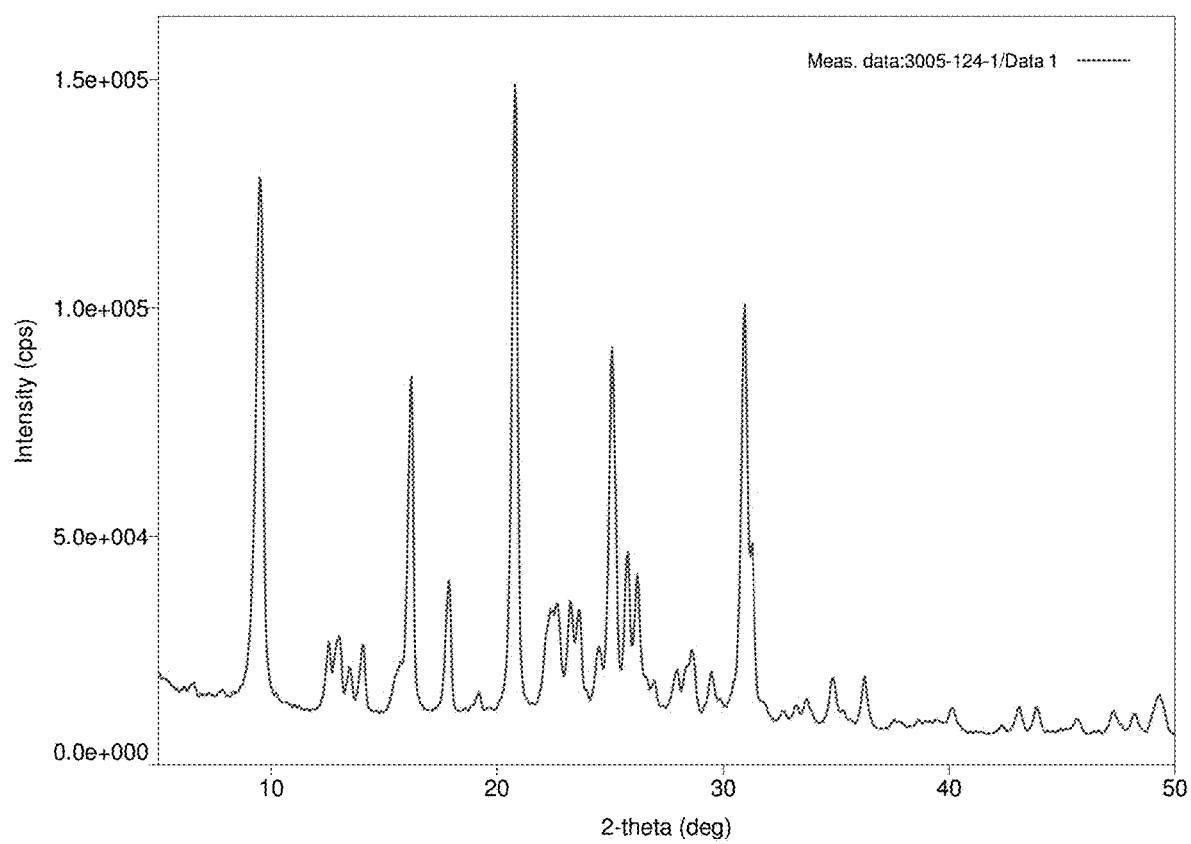
FIG. 7 is a X-ray diffraction pattern of a chabazite product made according to Comparative Example 2.

The sample was prepared following the gel formulation from Example 2, with the exception that 1,1-diethylhexahydro-1H-azepinium hydroxide was not used in the formulation. 580 grams of DI water, 54.6 grams of N,N,N-trimethyladamantylammonium hydroxide (Sachem, 25 wt % solution in water), 12.4 grams of potassium hydroxide (50 wt % solution in water), 21.1 grams of nitric acid (69 wt % solution in water), 0.15 grams of seeds with CHA structure, 277 grams of silica sol (Nalco, 40 wt % $SiO_2$ suspension in water), and 55.1 grams of sodium aluminate solution (Southern Ionics, 23.5 wt % $Al_2O_3$) were mixed together in this order. The molar composition of the gel was [14.5 $SiO_2$:1:0 $Al_2O_3$:1.81 $HNO_3$:0.44 $K_2O$:1.52 $Na_2O$:0.51 TMAAOH: 363$H_2O$]. The resulting gel was crystallized in a 2 L Parr autoclave under 150 rpm agitation using the following crystallization profile: 140° C. for 24 hours followed by 180° C. for 24 hours. The recovered solid was filtered, rinsed with DI water and dried in air at 105° C. overnight. The XRD pattern of Comparative Example 2 is shown in FIG. 7. According to the XRD pattern in FIG. 7, the sample from Comparative Example 2 is a mixture of chabazite and an unknown phase.

The dried zeolite powder was calcined in air for 1 hour at 450° C., followed by 6 hours 550° C. using a ramp rate of 3° C./min. After calcination, the sample was ammonium exchanged with an ammonium nitrate solution. After the ammonium exchange, the sample had an SAR of 13.6, $Na_2O$ of 0.02 wt % and $K_2O$ of 0.03 wt %. The acidity of the ammonium-exchanged sample determined by n-propylamine adsorption was 1.69 mmol/g. The ammonium exchanged sample exhibited the properties summarized in Table 1.

Comparative Example 3

The sample was prepared following the gel formulation from Example 6, with the exception that 1,1-diethylhexahydro-1H-azepinium hydroxide was not used in the formulation.

Figure 8:
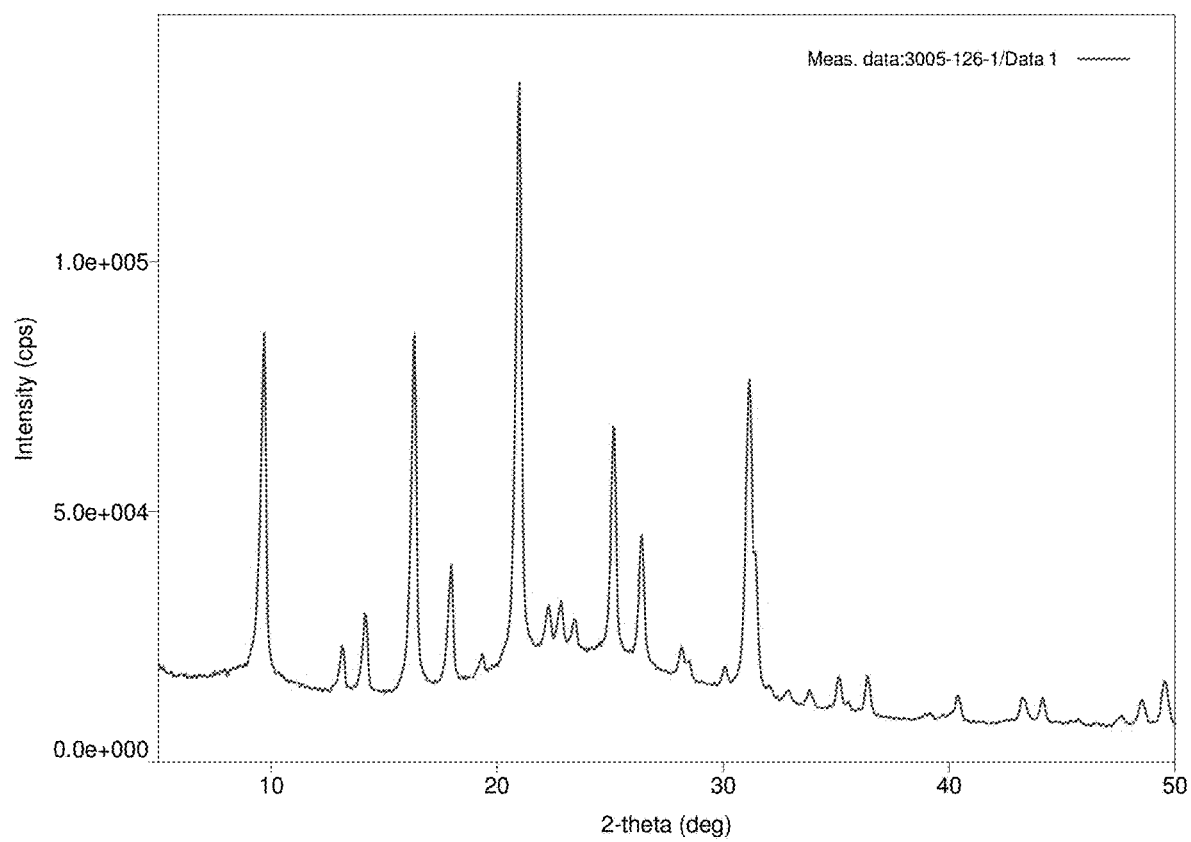
FIG. 8 is a X-ray diffraction pattern of a chabazite product made according to Comparative Example 3.

911 grams of DI water, 83.2 grams of N,N,N-trimethyladamantylammonium hydroxide (Sachem, 25 wt % solution in water), 7.4 grams of solid potassium hydroxide, 0.5 grams sodium hydroxide (50 wt % solution in water), 19.3 grams of nitric acid (69 wt % solution in water), 1.1 grams of seeds with CHA structure, 56.6 grams of sodium aluminate solution (Southern Ionics, 23.5 wt % $Al_2O_3$), and 422 grams of silica sol (Nalco, 40 wt % $SiO_2$) were mixed together in this order. The molar composition of the gel was [21 $SiO_2$:1:0 $Al_2O_3$:1.58 $HNO_3$:0.42 $K_2O$:1.58 $Na_2O$:0.74 TMAAOH: 525$H_2O$]. The resulting gel was crystallized in a 2 L Parr autoclave under 150 rpm agitation using the following crystallization profile: 160° C. for 48 hours. The recovered solid was filtered, rinsed with DI water and dried in air at 105° C. overnight. The XRD pattern of Comparative Example 3 is shown in FIG. 8. According to the XRD pattern in FIG. 8, the sample from Comparative Example 3 is a mixture of chabazite and an amorphous phase.

The dried zeolite powder was calcined in air for 1 hour at 450° C., followed by 6 hours 550° C. using a ramp rate of 3° C./min. After calcination, the sample was ammonium exchanged with an ammonium nitrate solution. After the ammonium exchange, the sample had an SAR of 20.5, $Na_2O$ of 0.09 wt % and $K_2O$ of 0.32 wt %. The acidity of the ammonium-exchanged sample determined by n-propylamine adsorption was 0.15 mmol/g. The ammonium-exchanged sample exhibited the properties summarized in Table 1.

Comparative Example 4

The sample was prepared following the gel formulation from Example 8, with the exception that 1,1-diethylhexahydro-1H-azepinium hydroxide was not used in the formulation.

Figure 9:
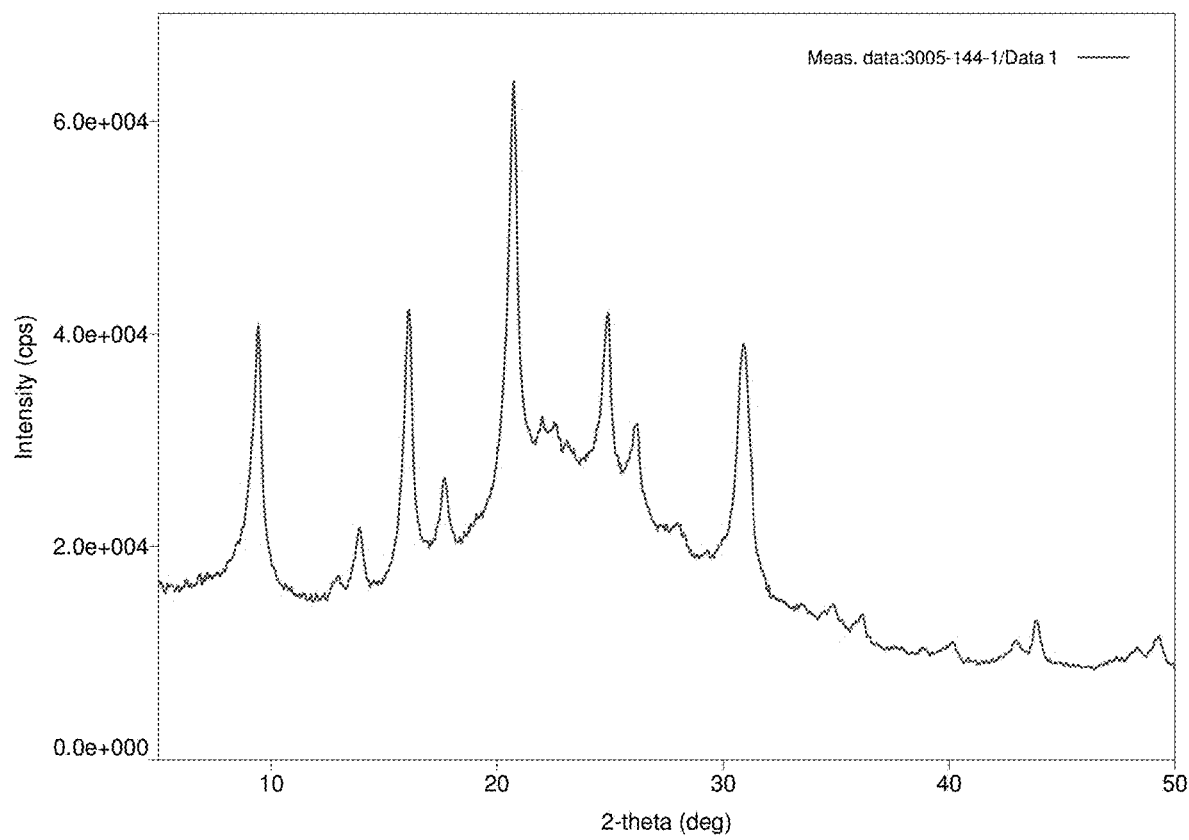
FIG. 9 is a X-ray diffraction pattern of a chabazite product made according to Comparative Example 4.

283 grams of DI water, 87.0 grams of N,N,N-trimethyladamantylammonium hydroxide (Sachem, 25 wt % solution in water), 3.7 grams of sodium hydroxide (50 wt % solution in water), 2.4 grams of nitric acid (69 wt % solution in water), 2.0 grams of seeds with CHA structure, 386 grams of silica sol (Nalco, 40 wt % $SiO_2$), and 37.3 grams of sodium aluminate solution (Southern Ionics, 23.5 wt % $Al_2O_3$) were mixed together in this order. The molar composition of the gel was [28 $SiO_2$:1:0 $Al_2O_3$:0.28 $HNO_3$:1.82 $Na_2O$:1.12 TMAAOH:364 $H_2O$]. The resulting gel was crystallized in a 2 L Parr autoclave under 150 rpm agitation using the following crystallization profile: 140° C. for 24 hours followed by 180° C. for 24 hours. The recovered solid was filtered, rinsed with DI water and dried in air at 105° C. overnight. The XRD pattern of Comparative Example 4 is shown in FIG. 9. According to the XRD pattern in FIG. 9, the sample from Comparative Example 4 is a mixture of chabazite and an amorphous phase.

The dried zeolite powder was calcined in air for 1 hour at 450° C., followed by 6 hours 550° C. using a ramp rate of 3° C./min. After calcination, the sample was ammonium exchanged with an ammonium nitrate solution. After the ammonium exchange, the sample had an SAR of 27.3, $Na_2O$ of 0.06 wt % and $K_2O$ of 0.01 wt %. The acidity of the ammonium-exchanged sample determined by n-propylamine adsorption was 0.58 mmol/g. The ammonium-exchanged sample exhibited the properties summarized in Table 1.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present disclosure.

Other embodiments of the invention will be apparent to those skilled in the art from consideration of the specification and practice of the invention disclosed herein. It is intended that the specification and examples be considered as exemplary only, with the true scope of the invention being indicated by the following claims.

TABLE 1

Analytical data for materials prepared in Inventive and Comparative Examples.

| Example | Form | SAR | $Na_2O$ (wt %) | $K_2O$ (wt %) | Acidity (mmol/g) | $Al_f/Al_{tot}$ (atomic ratio) | SA ($m^2/g$) | MPV ($cm^3/g$) |
|---|---|---|---|---|---|---|---|---|
| 1 | $NH_4$-exchanged | 12 | 0.01 | 0.19 | 1.77 | 0.73 | 644 | 0.23 |
| 2 | $NH_4$-exchanged | 14 | 0.00 | 0.01 | 1.49 | 0.69 | 703 | 0.26 |
| 4 | $NH_4$-exchanged | 14 | 0.02 | 0.24 | 1.65 | 0.79 | 700 | 0.26 |
| 6 | $NH_4$-exchanged | 21 | 0.00 | 0.00 | 1.06 | 0.74 | 704 | 0.26 |
| 8 | $NH_4$-exchanged | 29 | 0.00 | 0.00 | 1.01 | 0.93 | 776 | 0.28 |
| Comp Ex. 1 | $NH_4$-exchanged | 15 | 0.35 | 1.33 | 0.37 | 0.19 | 282 | 0.09 |
| Comp Ex. 2 | $NH_4$-exchanged | 14 | 0.02 | 0.03 | 1.69 | 0.78 | 396 | 0.14 |
| Comp Ex. 3 | $NH_4$-exchanged | 21 | 0.09 | 0.32 | 0.15 | 0.10 | 396 | 0.15 |
| Comp Ex. 4 | $NH_4$-exchanged | 27 | 0.06 | 0.01 | 0.58 | 0.51 | 330 | 0.11 |

The ammonium exchanged zeolites were Cu-exchanged with Cu-nitrate to achieve a CuO content of 4-6 wt % CuO. The Cu-exchanged materials were further steamed at 750° C. or 800° C. for 16 hours in 10% $H_2O$/air. The XRD patterns of the Cu-exchanged materials were measured before and after the hydrothermal treatment to obtain the XRD retention. The results are summarized in Table 2. The steamed Cu-exchanged materials were also evaluated for SCR activity, and results are summarized in Table 3.

TABLE 2

Analytical data for materials prepared in Inventive Examples.

| Example | Steam-calcination Temperature (° C.) | SAR | CuO (wt %) | XRD retention (%) |
|---|---|---|---|---|
| 3 | 800 | 14 | 3.7 | 72 |
| 5 | 750 | 14 | 6.0 | 80 |
| 7 | 800 | 20 | 4.4 | 88 |
| 9 | 800 | 26 | 4.0 | 83 |

TABLE 3

Analytical and SCR data for materials prepared in Inventive Examples.

| Example | Steam-calcination Temperature (° C.) | SAR | CuO (wt %) | NOx Conv. at 150° C. (%) | NOx Conv. at 200° C. (%) |
|---|---|---|---|---|---|
| 3 | 800 | 14 | 3.7 | 26 | 95 |
| 5 | 750 | 14 | 6.0 | 64 | 100 |
| 7 | 800 | 20 | 4.4 | 36 | 98 |
| 9 | 800 | 26 | 4.0 | 36 | 99 |

What is claimed is:

1. An as-synthesized microporous material having a CHA structure and comprising a first organic structure directing agent (OSDA) that has a general structure of the quaternary ammonium cation as follows:

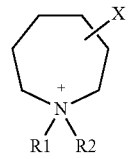

where $R_1$ is a $C_1$-$C_5$ derivatized or underivatized alkyl chain, and
$R_2$ is a $C_2$-$C_5$ derivatized or underivatized alkyl chain,
where X is H (hydrogen) or a $C_1$-$C_3$ alkyl substituent group or groups, derivatized or underivatized, attached to at least one carbon atom constituting the hexahydro-1H-azepinium ring.

2. The as-synthesized microporous material of claim 1, which has a molar silica to alumina ratio (SAR) of about 10 or higher.

3. The as-synthesized microporous material of claim 2, wherein the SAR ranges from 10 to 50.

4. The as-synthesized microporous material of claim 1, further comprising at least one second OSDA, wherein the first OSDA and the second OSDA are a hydroxide or a salt chosen from fluoride, chloride, bromide, iodide, or a mixture of thereof.

5. The as-synthesized microporous material of claim 4, wherein the second OSDA comprises a compound chosen from an amine, monoquaternary ammonium compound, or diquaternary ammonium compound, capable of forming a zeolite with chabazite (CHA) structure.

6. The microporous crystalline material of claim 5, wherein the second OSDA is chosen from N,N,N-trimethyl-1-adamantylammonium, N,N-dimethyl-N-ethylcyclohexylammonium, N,N-dimethylpyrrolidinium, N,N-dimethylpiperidinium, N,N-dimethylhexahydroazepinium, benzyltrimethylammonium, and mixtures thereof.

7. The as-synthesized microporous material of claim 1, wherein at least one of $R_1$ and $R_2$ is ethyl.

8. The as-synthesized microporous material of claim 1, wherein the first OSDA comprises N,N-diethylhexahydro-1H-azepinium.

9. A microporous crystalline material made by calcining and optionally ammonium-exchanging the as-synthesized microporous material of claim 1.

10. The microporous crystalline material of claim 9, further comprising at least one catalytically active metal.

11. The microporous crystalline material of claim 10, where the at least one catalytically active metal comprises copper or iron.

12. The microporous crystalline material of claim 11, wherein the catalytically active metal comprises copper Cu, which is present as CuO in an amount of 1-10 wt % of the microporous crystalline material.

13. The microporous crystalline material of claim 11, wherein the catalytically active metal comprises iron Fe, which is present as $Fe_2O_3$ in an amount of 0.2-10 wt % of the microporous crystalline material.

14. A method of selective catalytic reduction of nitrogen oxides in exhaust gas, said method comprising contacting said exhaust gases with an article comprising a microporous crystalline material according to claim 11.

15. The method of claim 14, where said contacting is performed in the presence of ammonia, urea, an ammonia generating compound, or a hydrocarbon compound.

16. A method of synthesizing a microporous crystalline material having a CHA structure and comprising a first organic structure directing agent (OSDA) that has a general structure of the quaternary ammonium cation as follows:

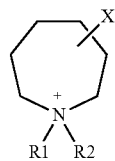

where $R_1$ is a $C_1$-$C_5$ derivatized or underivatized alkyl chain, and
$R_2$ is a $C_2$-$C_5$ derivatized or underivatized alkyl chain,
where X is H (hydrogen) or a $C_1$-$C_3$ alkyl substituent group or groups, derivatized or underivatized, attached to at least one carbon atom constituting the hexahydro-1H-azepinium ring, the method comprising:
mixing sources of alumina, silica, one or more OSDAs, optionally alkali containing additive, water and optionally a seed material to form a gel; and
heating the gel in an autoclave to form a crystalline CHA product.

17. The method of claim 16, wherein the microporous crystalline material has a molar silica to alumina ratio (SAR) of about 10 or higher.

18. The method of claim 17, wherein the SAR ranges from 10 to 50.

19. The method of claim 16, further comprising at least one second OSDA, wherein the first OSDA and the second OSDA are a hydroxide or a salt chosen from fluoride, chloride, bromide, iodide, or a mixture of thereof.

20. The method of claim 19, wherein the second OSDA comprises a compound chosen from an amine, monoquaternary ammonium compound, or diquaternary ammonium compound, capable of forming a zeolite with chabazite (CHA) structure.

21. The method of claim 20, wherein the second OSDA is chosen from N,N,N-trimethyl-1-adamantylammonium, N,N-dimethyl-N-ethylcyclohexylammonium, N,N-dimethylpyrrolidinium, N,N-dimethylpiperidinium, N,N-dimethylhexahydroazepinium, benzyltrimethylammonium, and mixtures thereof.

22. The method of claim 16, wherein at least one of R1 and R2 is ethyl.

23. The method of claim 16, wherein the first OSDA comprises N,N-diethylhexahydro-1H-azepinium.

24. The method of claim 16, further comprising calcining said CHA product; and optionally ammonium-exchanging said CHA product.

25. The method of claim 24, further comprising introducing at least one catalytically active metal into the microporous crystalline material by liquid-phase or solid-phase ion exchange, impregnation, direct synthesis or combinations thereof.

26. The method of claim 25, where the at least one catalytically active metal comprises copper or iron.

27. The method of claim 26, wherein the catalytically active metal comprises copper Cu, which is present as CuO in an amount of 1-10 wt % of the microporous crystalline material.

28. The method of claim 26, wherein the catalytically active metal comprises iron Fe, which is present as $Fe_2O_3$ in an amount of 0.2-10 wt % of the microporous crystalline material.

29. The method of claim 16, where the alkali containing additive comprises a source of potassium or sodium, or a mixture of thereof.

* * * * *